United States Patent

Kozak

[15] 3,657,456

[45] Apr. 18, 1972

[54] COORDINATOR DEVICE RHYTHM

[72] Inventor: Edward J. Kozak, 109 East Kings Highway, Shreveport, La. 71104

[22] Filed: Aug. 26, 1970

[21] Appl. No.: 40,631

[52] U.S. Cl. .............................................. 35/8 R, 35/29 R
[51] Int. Cl. ........................................................ G09b 7/00
[58] Field of Search .................. 35/8 R, 24 R, 29 C, 29 R, 40, 35/29 B, 6, 14; 40/132 C; 273/1 E, 1 ES, 138 A, 139, 141 A; 340/311, 312, 332; 84/470, 478

[56] References Cited

UNITED STATES PATENTS

| | | | |
|---|---|---|---|
| 450,615 | 4/1891 | Delany | 35/1 X |
| 1,103,812 | 7/1914 | Murdock | 40/132 C |
| 1,324,276 | 12/1919 | Schantz | 84/478 UX |
| 1,698,216 | 1/1929 | Craig | 40/132 C X |
| 1,984,599 | 12/1934 | Safar | 35/6 |
| 2,425,122 | 8/1947 | Petty et al. | 35/14 X |
| 2,587,381 | 2/1952 | Peterson | 273/141 A X |
| 2,923,069 | 2/1960 | Nachem | 35/14 |
| 3,346,968 | 10/1967 | Dellinger | 35/6 |

Primary Examiner—Harland S. Skoquist
Attorney—Newton, Hopkins & Ormsby

[57] ABSTRACT

A device for teaching coordination or rhythm which includes a plurality of figures which may be illuminated in varying cycles of equally spaced intervals, a plurality of illuminatable lamps associated with each of said figures, an equal number for each of said figures, and a multiplicity of switches for said lamps so that any or all of said lamps associated with said figures may be illuminated simultaneously or in a chosen pattern for a cycle of numbers.

5 Claims, 4 Drawing Figures

Patented April 18, 1972

3,657,456

INVENTOR
EDWARD J. KOZAK

BY: Newton, Hopkins & Ormsby
ATTORNEYS

COORDINATOR DEVICE RHYTHM

BACKGROUND OF THE INVENTION

The present invention relates in general to a rhythm-coordinator and more particularly to a rhythm coordinator instrument used as a teaching aid to instruct one or more persons in improving their rhythm and/or coordination.

A present need exists for a simple device for enabling rhythm and coordination to be taught for various purposes. For example, in both public and private schools, a need exists for a device for teaching children with special learning disabilities or retardations to develop control of large and small muscles and to develop audio-visual-motor coordination. Likewise, such a rhythm and coordination device could be used to condition athletes by providing the necessary rhythm changes for a routine program of development and maintenance, and for numerous other applications, such as in the medical use of testing kinesthetic responses and perceptiveness of the eye and ear.

While present devices for teaching rhythm and coordination exist, the same are generally somewhat complex, difficult to construct and expensive.

SUMMARY OF THE INVENTION

Accordingly, one object of the present invention is the provision of unique instrument for teaching and measuring rhythm and coordination.

It is another object of the present invention to provide a new and improved device for teaching coordination and rhythm by programming a "beat" or "cycle" to a group of characters so that participants may respond only upon receiving the preprogrammed signal from the device.

It is a still further object of the invention to provide a device which may be used as a teaching aid for speech as well as for coordinated movements of the body for mental alertness and exercise.

One other object of the subject invention is to provide a unique device for teaching rhythm and coordination wherein a plurality of characters may be illuminated in cycles of varying rates and wherein additional coded illumination may be provided for each of the plurality of characters.

BRIEF DESCRIPTION OF THE DRAWINGS

These and other objects and advantages of the invention will become apparent in the course of the following detailed description when viewed together with the accompanying drawing, in which.

DETAILED DESCRIPTION OF THE INVENTION

Figure 1:
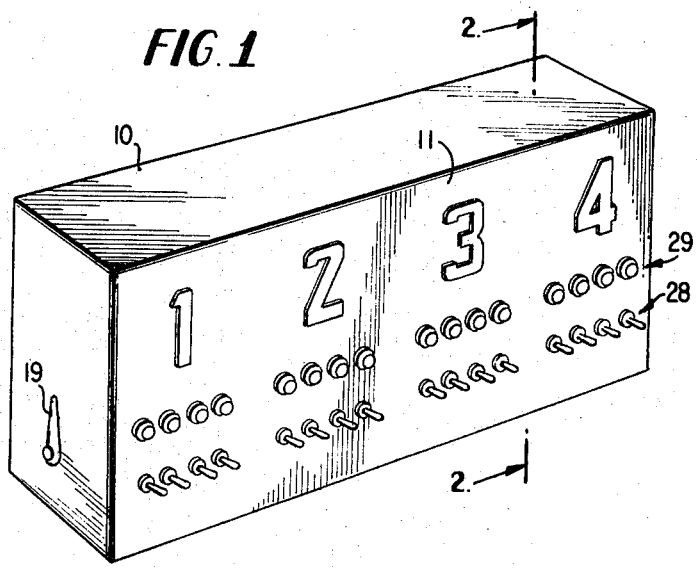
FIG. 1 is an isometric view of the front elevation of the rhythm and coordinating device according to the present invention.
Figure 2:
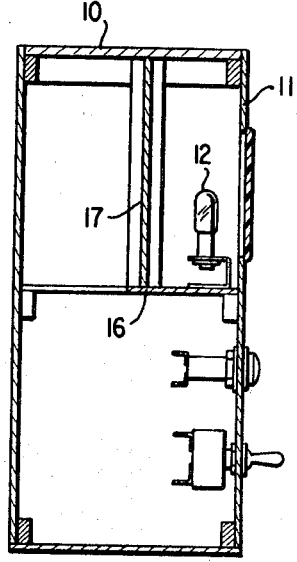
FIG. 2 is a cross sectional view of the device as taken along lines 2—2 of FIG. 1.

Referring now to the drawing wherein like reference numerals designate identical or corresponding parts throughout the several views and more particularly to FIG. 1 thereof, wherein is shown a cabinet 10 which houses the working components of the device. It should be understood that the cabinet 10 may be constructed of wood, metal, or the like. The front face of the cabinet 10 displays four figures --1,2,3, and 4. These figures are of plastic and are shown as being set into the front face 11 of the cabinet 10. Immediately behind each of the figures, as illustrated in FIG. 2 are conventional lamps 12, 13, 14, and 15. The figures are translucent in character so that they may appear to be illuminated when the lamps are burning.

Referring now to FIG. 2, it is seen that the area occupied by the lamps and figures are housed by a lower wall section 16 on the bottom side and by a strip of mirrored glass 17 on the back side. Thus, when any one of the lamps is burning, the mirror 17 will assist in casting the greatest amount of light onto its corresponding figure to make it appear illuminated.

Referring now again to FIG. 1, there is shown an arrangement of switches and lamps grouped under the several figures --1,2,3, and 4. In the present instance, each of the figures -- 1,2,3, and 4 has a group of four electrical switches 28 and four corresponding lamps 29 arranged beneath it. As will be explained in detail hereinafter, these switches operate only one lamp so that a program may be set up by an operator to light any one or all of the lamps under a given figure, or to selectively switch on any combination of these lamps for a chosen pattern for the full cycle of the illumination of the figures 1 through 4.

Figure 3:
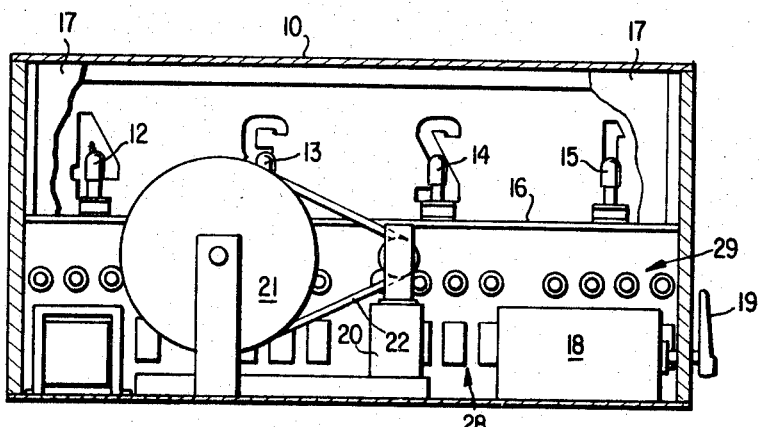
FIG. 3 is a rear view of the device shown in FIG. 1.

As seen in FIG. 3, the device of the subject invention further includes a variable transformer 18 controlled by a rheostat. The rheostat has an external knob 19 whereby the current applied to the figures may be varied.

Figure 4:
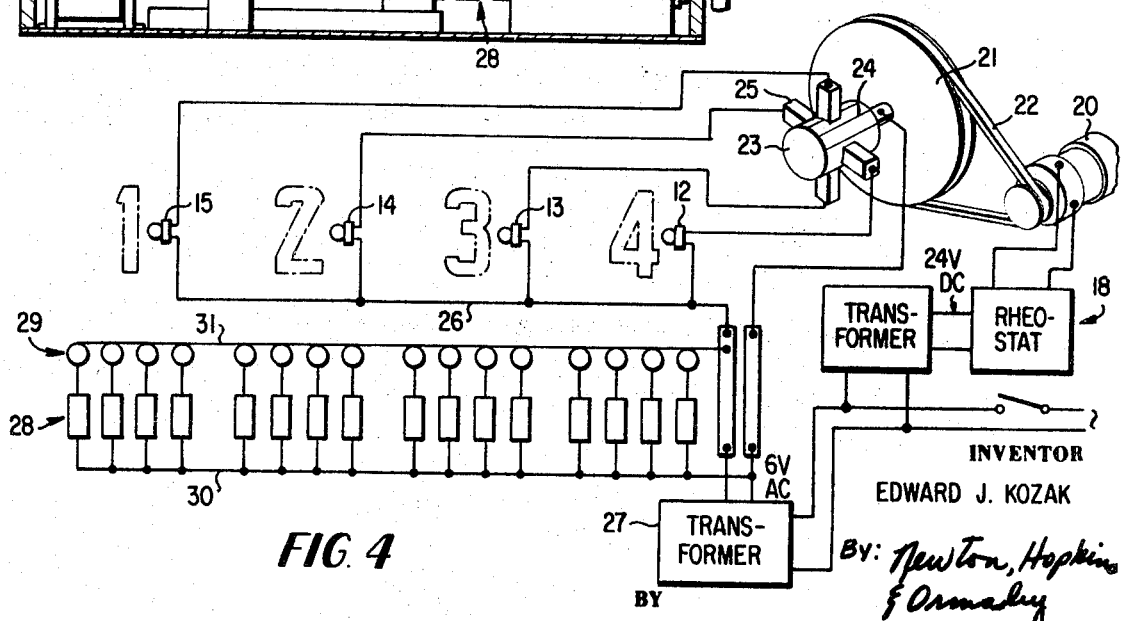
FIG. 4 is a pictorial diagram of the electrical circuit for operating the rhythm and coordinating device of the present invention.

As shown in FIG. 4, the output of the rheostat is connected to a motor 20 which, in turn, is coupled to a large pulley 21 by means of a driving belt 22 to effect a slow-down in speed of the driven pulley as desired. The pulley 21, in turn, rotates a cylinder 23 provided with spaced metallic contact elements 24 around its periphery as illustrated in FIG. 4. Associated with these contact elements are contact fingers 25 (with the proper wire conductor), one leading to each of the lamps 12, 13, 14 and 15.

With reference again to FIG. 4, it can be seen that a conventional electrical current from a 110 volt A.C. source flows by separate circuit through the variable transformer 18 to the motor 20. An operator may readily vary the speed of the motor 20 by making use of the variable transformer 18. As seen in this same Figure, the same supply voltage is fed through another circuit and through a small and separate transformer 27; one leg of the circuit after passing through the transformer being directed to the shaft of the cylinder 23 and hence to each of the contact elements 24; while the other leg of the circuit serves as a common return 26 for the lamps 12, 13, 14, and 15.

It can now be seen that, as the cylinder 23 rotates, the contact elements 24 will be made to pass beneath their respective contact fingers 25 thus energizing that particular part of the circuit and that particular lamp. Since these components are equally spaced around the cylinder 23, the figures will appear to be illuminated in their respective order and for an equal length of time. Should an operator wish to vary the length of the total time cycle of the numbers, he may do so by merely varying the rotating speed of the motor 20.

As aforementioned, immediately beneath each of the above described numbers 1, 2, 3 and 4 are four switches designated generally by the numeral 28, with each switch controlling a lamp designated generally by the numeral 29.

FIG. 4 shows the various circuits and current supply for the above-mentioned lamps 29. It is seen that the transformer 27 also supplies the current for the lamps 29, with one leg of the circuit 30 being made common to one side of all of the switches 28 and a return conductor 31 being common to one side of all the lamps 29. A connecting jumper 32 is provided between each switch and lamp.

It should be noted that the FIGS. 1 through 4 with their corresponding lamps 12, 13, 14 and 15 are on an electrical circuit separate and apart from the lamps 29 referred to above. Thus, while the figures respond individually and according to a preselected cycle timing, the lower lamps 29 will burn constantly and only when their circuit is closed by means of an associated switch 28.

A description of the operation of the present invention by way of examples will follow. It should be understood that the examples to be given are merely exemplary and numerous other uses are possible.

Let it be supposed that a small child of any age who has a need for developing coordination is asked to respond quickly to the figures as they are sequentially illuminated. The instructor may start by having the figures light up in a slow sequence and then gradually increase the motor speed to reduce the total time cycle and thereby increase the speed at which the child must respond. Suppose, also, that the child is asked to give some response, whether oral or otherwise, every time he sees the figure 2 appear, or the figures 1 and 4 --or any number of such combinations. It should be readily apparent that through such a program of visual and mental exercise the child can learn to respond more rapidly and thereby improve his coordination.

By way of further example, let it be assumed now that a group of children are seated at different tables and that the device of the present invention is used to teach them all to cooperate and respond together. Let it further be assumed that the individually operated lamps 29 of the face of the device are colored, such as reading from left to right in each group: red, yellow, blue and green. The colored lamps in that same order will also be beneath each of the figures 1 through 4. Suppose the instructor tells all of the children at table number one that the red lamp will be theirs, and he turns on the red lamp. Suppose at table number two that the children are given the yellow lamp, table number three the blue lamp, and table number four the green lamp. The children are now instructed that when the figure 1 is lighted, the children at table number one are to clap their hands together; and at the other tables, the same instructions; that is, whenever a selected figure is lighted over their color, they are to clap their hands. The instructor may now turn the device on and the figures will light in the sequence 1, 2, 3, and 4. The children at the different tables will respond by clapping as their respective figure appears before them.

It should be apparent that such a device not only teaches alertness and immediate recognition by the children, but also teaches them coordination to a given rhythm and cooperation in participation with others.

It should also now be apparent that the device of the subject invention is quite versatile in that it may be used to make children respond to teaching whereas they might otherwise be difficult to teach. The device is most helpful in the teaching of mentally retarded or handicapped children, in that what appears to be a game is actually mental therapy and group coordination.

It should further be noted that the device of the present invention is simple in its construction, is inexpensive, and is small and light enough to be considered portable. The figures and lamps may be large enough to be seen across a large size room and, since both the lamp circuit and the figures are acted upon when they are lighted, the device may be used in poorly lighted rooms or even in the dark.

The above invention in its particular embodiment is by way of example only and it is to be understood that numerous changes could be made in the actual construction without departing from the spirit and scope of the invention. For example, while the characters of the subject invention have been shown as figures, it should be obvious that letters could be readily used. Also, while only four figures have been shown, any desired number could be utilized.

What is claimed as new and desired to be secured by Letters Patent of the United States is:

1. A device for producing visual signals in a selected predetermined rhythm comprising: a plurality of characters, means comprising a continuously operable motor for successively illuminating said characters in a predetermined timing sequence, means for varying said timing sequence, a plurality of differently colored lamps associated with each of said characters, and means for selectively illuminating such lamps in a pattern independent of the illumination of said characters.

2. A device as in claim 1 further including a rheostat for controlling the speed of said motor.

3. A device as in claim 2 wherein said means for varying the timing sequence further includes a rotatable cylinder having spaced metallic contacts mounted thereon, a plurality of contact fingers each of which is connected with the illuminator of one of said characters, said fingers successively making contact with said metallic contacts when said cylinder is rotated and a connection for driving said cylinder from said motor.

4. A device as in claim 3 wherein said driving connection comprises pulleys mounted on the shafts of said motor and cylinder and a belt connecting said pulleys.

5. A device as in claim 4 wherein said plurality of characters are of a translucent material and are housed within a viewing front panel and wherein a mirror is situated behind said plurality of characters.

* * * * *